United States Patent
Seong

(10) Patent No.: US 6,622,501 B2
(45) Date of Patent: Sep. 23, 2003

(54) AIR CONDITIONING SYSTEM AND METHOD FOR CONTROLLING THE SAME

(75) Inventor: See Poong Seong, Seoul-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/062,533

(22) Filed: Feb. 5, 2002

(65) Prior Publication Data

US 2003/0070440 A1 Apr. 17, 2003

(30) Foreign Application Priority Data

Oct. 15, 2001 (KR) ........................................ 2001/63357

(51) Int. Cl.[7] .............................. F25B 7/00; G05D 23/00
(52) U.S. Cl. ........................................... 62/175; 236/51
(58) Field of Search ............................ 62/175; 236/51; 165/205, 207, 208, 209; 340/825.52

(56) References Cited

U.S. PATENT DOCUMENTS

| | | | | |
|---|---|---|---|---|
| 5,383,336 A | * | 1/1995 | Nishida et al. | 62/115 |
| 5,390,506 A | * | 2/1995 | Sogabe et al. | 62/175 |
| 5,435,147 A | * | 7/1995 | Mochizuki et al. | 62/175 |
| 5,499,510 A | * | 3/1996 | Yoshida et al. | 62/175 |
| 5,522,230 A | * | 6/1996 | Shima et al. | 62/127 |
| 5,592,824 A | * | 1/1997 | Sogabe et al. | 62/127 |
| 5,603,225 A | * | 2/1997 | Tobi et al. | 62/175 |
| 5,630,324 A | * | 5/1997 | Yoshida et al. | 62/175 |
| 5,647,223 A | * | 7/1997 | Wada et al. | 62/175 |
| 6,126,080 A | * | 10/2000 | Wada | 236/51 |
| 6,290,141 B1 | * | 9/2001 | Park et al. | 236/51 |
| 6,453,689 B2 | * | 9/2002 | Wada | 62/175 |

* cited by examiner

*Primary Examiner*—Marc Norman
(74) *Attorney, Agent, or Firm*—Birch, Stewart, Kolasch & Birch, LLP

(57) ABSTRACT

An air conditioning system which has a plurality of indoor units installed inside of a predefined space for performing air conditioning and an outdoor unit installed outside of the space for controlling the indoor units, and a method for controlling the same. The indoor units store unique production numbers assigned respectively thereto in manufacturing processes thereof, and the outdoor unit recognizes the production numbers of the indoor units and automatically sets addresses in the indoor units on the basis of the recognized production numbers. Therefore, in an installation process, an installer need not personally set addresses in the indoor units one by one, resulting in greater convenience of installation. Further, as compared with conventional air conditioning systems, a period of time required for the address setting and an error occurrence probability can be reduced.

9 Claims, 30 Drawing Sheets

AIR CONDITIONING SYSTEM AND METHOD FOR CONTROLLING THE SAME

BACKGROUND OF THE INVENTION

1. Field of the Invention

The present invention relates to an air conditioning system and a method for controlling the same, and more particularly to an air conditioning system having a plurality of indoor units installed inside of a predefined space and an outdoor unit installed outside of the space for controlling the indoor units, wherein the outdoor unit can simply set addresses in the indoor units, and a method for controlling the same.

2. Description of the Related Art

Generally, a multi-air conditioner signifies an air conditioning system consisting of one outdoor unit and a plurality of indoor units. For the purpose of attaining an efficient operation of the multi-air conditioner, the outdoor unit must be able to identify the plurality of indoor units, respectively, to control them.

For identification, the plurality of indoor units are typically assigned, respectively, numbers, or addresses. For example, the indoor units may be numbered 1, 2, 3, . . . , n. The outdoor unit can exchange data with the plurality of indoor units by recognizing their respective numbers.

An example of conventional constructions for transmission and reception of data between an outdoor unit and a plurality of indoor units assigned numbers as mentioned above is shown in FIG. 1, which is a block diagram of a conventional air conditioning system. As shown in this drawing, the conventional air conditioning system comprises an outdoor unit 1, and a plurality of indoor units 2 each connected to the outdoor unit 1 via a communication line 5. The outdoor unit 1 includes a microcomputer 3 for controlling the entire operation of the outdoor unit 1, and each of the indoor units 2 includes a microcomputer 4 for controlling the entire operation of a corresponding one of the indoor units 2.

The outdoor unit 1 and each of the indoor units 2 exchange control information and various control signals, such as ON/OFF signals, with each other over the communication line 5. In particular, the outdoor unit 1 recognizes numbers assigned respectively to the plurality of indoor units, so as to determine which one of the indoor units currently exchanges data therewith. In other words, the outdoor unit can control the plurality of indoor units individually owing to the previous recognition of information about respective numbers and positions of the indoor units. As a result, the outdoor unit can control a specific one of the indoor units with, for example, the ON signal on the basis of a number and position of the specific indoor unit.

A dip switch 6 is conventionally provided in each of the indoor units 2 to set a number of a corresponding one of the indoor units 2 to be recognized by the outdoor unit 1. An installer sets a number in each indoor unit using the dip switch 6 on the spot where each indoor unit is installed. Once a corresponding number is set by means of the dip switch 6, each of the indoor units 2 transfers information regarding the set number to the microcomputer 3 of the outdoor unit 1. As a result, the outdoor unit microcomputer 3 can control a specific one of the plurality of indoor units by recognizing the set numbers of the indoor units, respectively.

In the above-mentioned air conditioning system, however, the installer must personally assign the respective numbers to the plurality of indoor units using the dip switches. For this reason, a larger number of indoor units may result in a higher probability for the installer to manipulate the dip switches erroneously, causing indoor unit numbers to be duplicated or misread.

Further, each dip switch is a hardware module mounted directly to a corresponding indoor unit, resulting in an increase in parts costs. Furthermore, the indoor unit must have a separate microcomputer port for receiving information set by the installer using the dip switch. Thus, there is considerable difficulty in developing such an indoor unit. Moreover, a larger number of indoor units increases the number of digits of numbers to be set therein. In this case, each indoor unit has to be equipped with a dip switch capable of setting a larger number, which leads to an increase in the number of ports of the microcomputer in the indoor unit, connected to the dip switch, and in turn necessitates the replacement of the indoor unit microcomputer with a high-price chip.

SUMMARY OF THE INVENTION

Therefore, the present invention has been made in view of the above problems, and it is an object of the present invention to provide an air conditioning system having a plurality of indoor units installed inside of a predefined space for performing air conditioning and an outdoor unit installed outside of the space for controlling the indoor units, wherein the indoor units store unique production numbers assigned respectively thereto in manufacturing processes thereof, and the outdoor unit recognizes the production numbers of the indoor units and automatically sets addresses in the indoor units on the basis of the recognized production numbers, and a method for controlling the same.

In accordance with one aspect of the present invention, the above and other objects can be accomplished by the provision of an air conditioning system comprising a plurality of indoor units each adapted to suck indoor air, perform a heat exchange operation for the sucked indoor air with a heat exchange medium and discharge the heat-exchanged air, each of the indoor units including a production number storage area defined in a memory which is installed to prevent a corresponding one of the indoor units from being subject to a data loss when a power failure occurs, the production number storage area storing information about a unique production number assigned to the corresponding indoor unit in a manufacturing process thereof; and an outdoor unit connected in common to the plurality of indoor units and adapted to perform a heat exchange operation for the heat exchange medium with external air, the outdoor unit recognizing first digit values of the production numbers stored in the indoor units, recognizing the remaining digit values of ones of the production numbers whose first digit values are the same, sequentially setting addresses in ones of the indoor units corresponding to the production numbers having the same first digit values on the basis of the recognized first and remaining digit values, and then setting addresses in ones of the indoor units corresponding to ones of the production numbers whose first digit values are not the same, in the same manner as that performed with respect to the indoor units corresponding to the production numbers having the same first digit values.

In accordance with another aspect of the present invention, there is provided a method for controlling an air conditioning system, comprising the steps of a), by an outdoor unit, transmitting a setting start signal indicative of the start of an automatic address setting operation to a plurality of indoor units; b), by the outdoor unit, sequentially recognizing production numbers of the indoor units and setting addresses in the indoor units on the basis of the recognized production numbers; and c), by the indoor units, storing the addresses set at the step b) and transmitting and receiving data to/from the outdoor unit on the basis of the set addresses, respectively.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
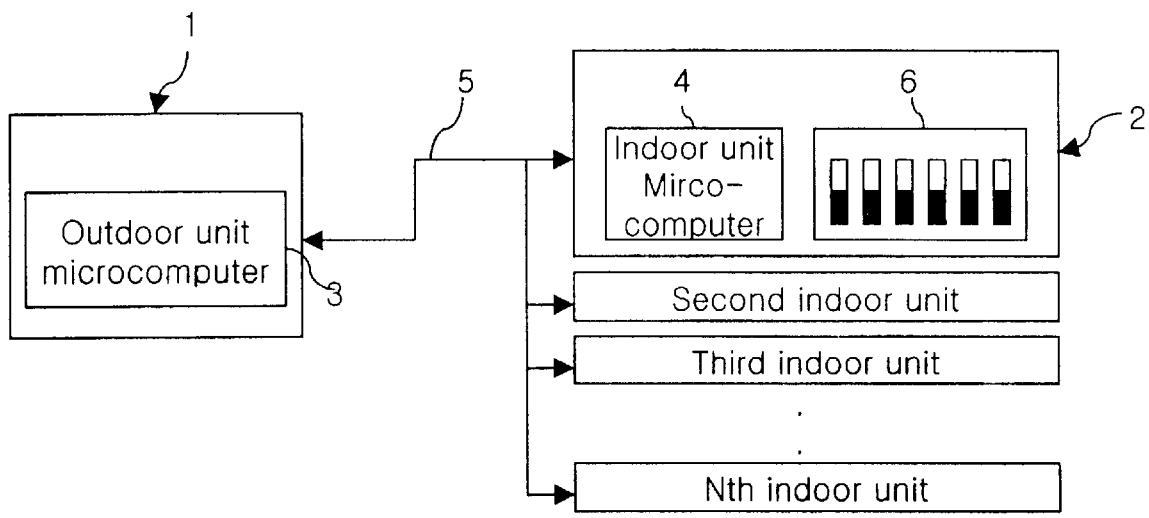
FIG. 1 is a block diagram showing the construction of a conventional air conditioning system.
Figure 2:
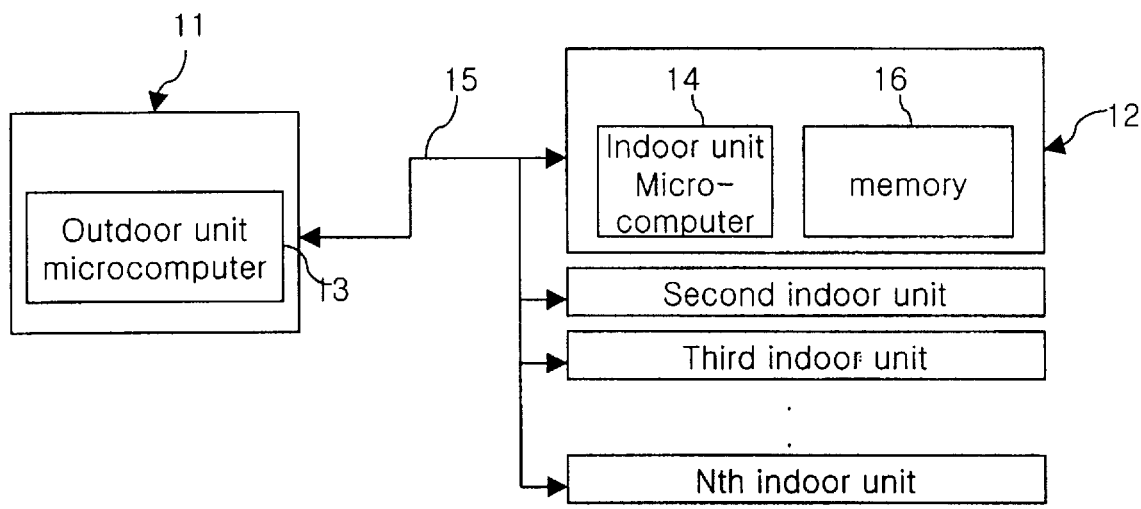
FIG. 2 is a block diagram showing the construction of an air conditioning system in accordance with the present invention.

With reference to FIG. 2, there is shown in block form the construction of an air conditioning system in accordance with the present invention. As shown in this drawing, the air conditioning system comprises one outdoor unit 11, and a plurality of indoor units 12 each connected to the outdoor unit 11 via a communication line 15. The outdoor unit 11 includes a microcomputer 13 for controlling the entire operation of the outdoor unit 11, and each of the indoor units 12 includes a microcomputer 14 for controlling the entire operation of a corresponding one of the indoor units 12. Each of the indoor units 12 further includes a memory 16, which may preferably be an electrically erasable and programmable read only memory (EEPROM). The memory 16 is adapted to store data about the operation of a corresponding one of the indoor units 12 in order to prevent the corresponding indoor unit from being subject to a data loss when a power failure occurs.

In the present invention, the memory 16 preferably stores information regarding a unique production number of the corresponding indoor unit 12.

Figure 3:
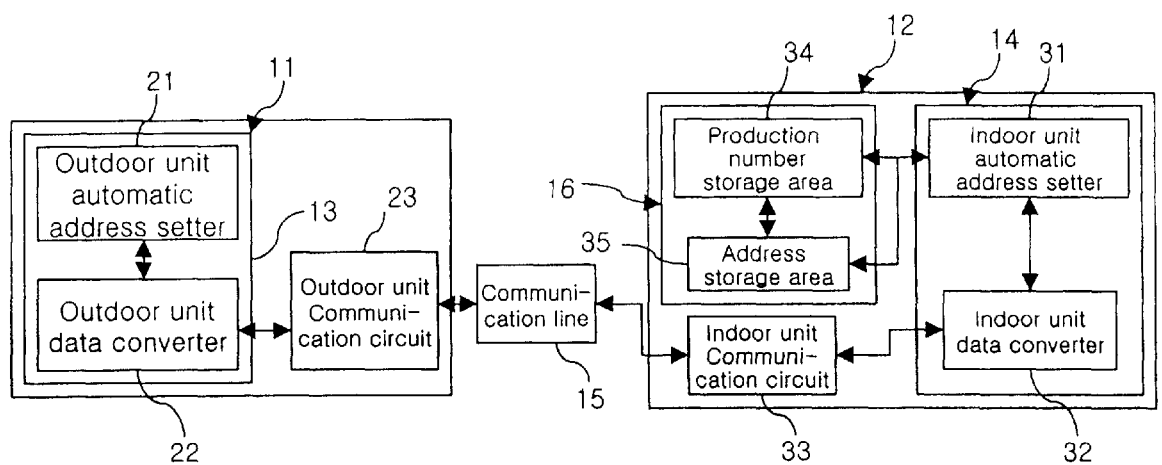
FIG. 3 is a detailed block diagram of the air conditioning system in accordance with the present invention.

The construction of the air conditioning system according to the present invention is shown in more detail in FIG. 3.

With reference to FIG. 3, the microcomputer 13 in the outdoor unit 11 includes an automatic address setter 21 for recognizing the production numbers stored in the plurality of indoor units and automatically setting addresses in the indoor units on the basis of the recognized production numbers. In the present embodiment, the construction of the air conditioning system will hereinafter be described in connection with only the first indoor unit among the plurality of indoor units 12 for illustrative purposes. The outdoor unit microcomputer 13 further includes a data converter 22 for converting data transmitted and received between the outdoor unit 11 and the first indoor unit 12 into formats appropriate to standards of the communication line 15 and outdoor unit 11. A communication circuit 23 is provided in the outdoor unit 11 to transmit output data from the data converter 22 to the first indoor unit 12 over the communication line 15, and to receive data transmitted from the first indoor unit 12 over the communication line 15 and transfer the received data to the data converter 22.

The memory 16 in the first indoor unit 12 includes a production number storage area 34 for storing information regarding a production number of the first indoor unit 12, and an address storage area 35 for storing information about an address of the first indoor unit 12 set by the outdoor unit automatic address setter 21. The outdoor unit automatic address setter 21 is adapted to set the address of the first indoor unit 12 on the basis of the production number information stored in the production number storage area 34 of the memory 16. The microcomputer 14 in the first indoor unit 12 includes an automatic address setter 31 for accessing the production number storage area 34 of the memory 16 to read the production number information therefrom, and transmitting the read production number information to the outdoor unit 11 so that the address of the first indoor unit 12 can automatically be set by the outdoor unit automatic address setter 21 on the basis of the transmitted production number information. The indoor unit automatic address setter 31 also functions to store the information about the address of the first indoor unit 12 set by the outdoor unit automatic address setter 21 in the address storage area 35 of the memory 16. Similarly to the outdoor unit microcomputer 13, the indoor unit microcomputer 14 further includes a data converter 32 for converting data transmitted and received between the first indoor unit 12 and the outdoor unit 11 into formats appropriate to standards of the communication line 15 and indoor unit 12.

The first indoor unit 12 further includes a communication circuit 33 for transmitting and receiving data to/from the communication line 15. The indoor unit communication circuit 33 and the outdoor unit communication circuit 23 transmit and receive data over the communication line 15.

Figure 4A:
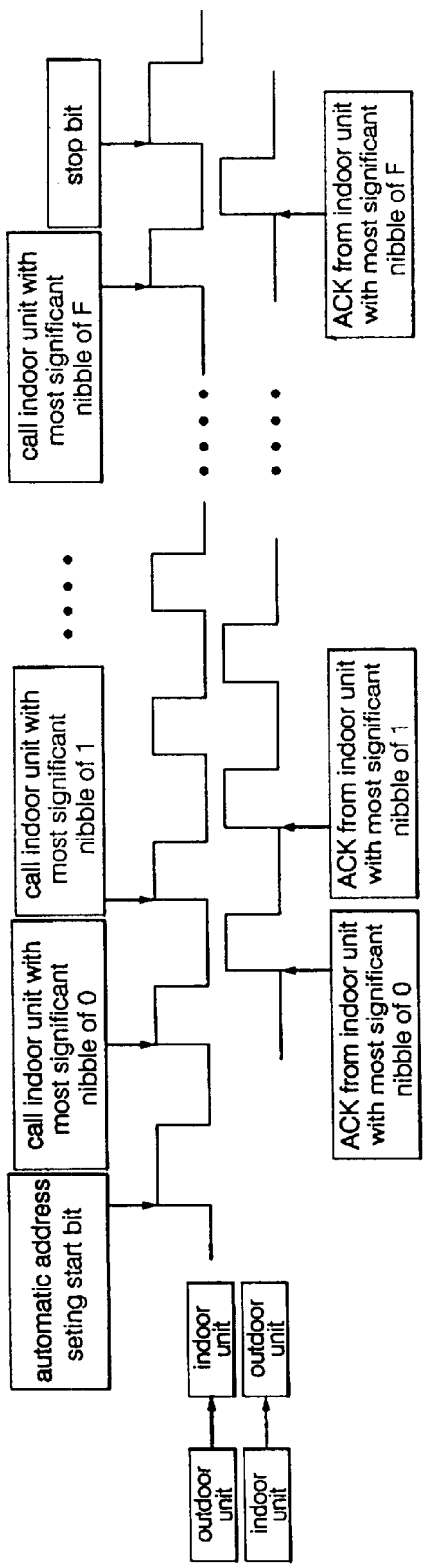
FIGS. 4a, 4b and 4c are timing diagrams illustrating a basic address setting algorithm of the air conditioning system according to the present invention.
Figure 4B:
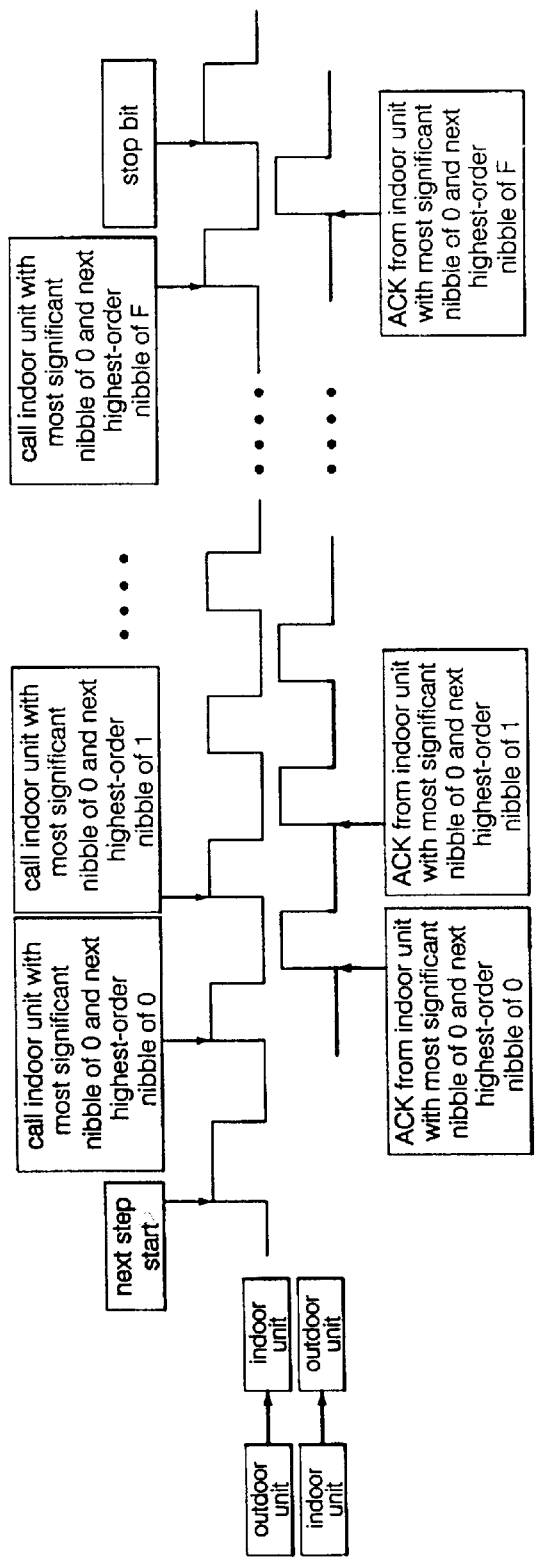
Figure 4C:
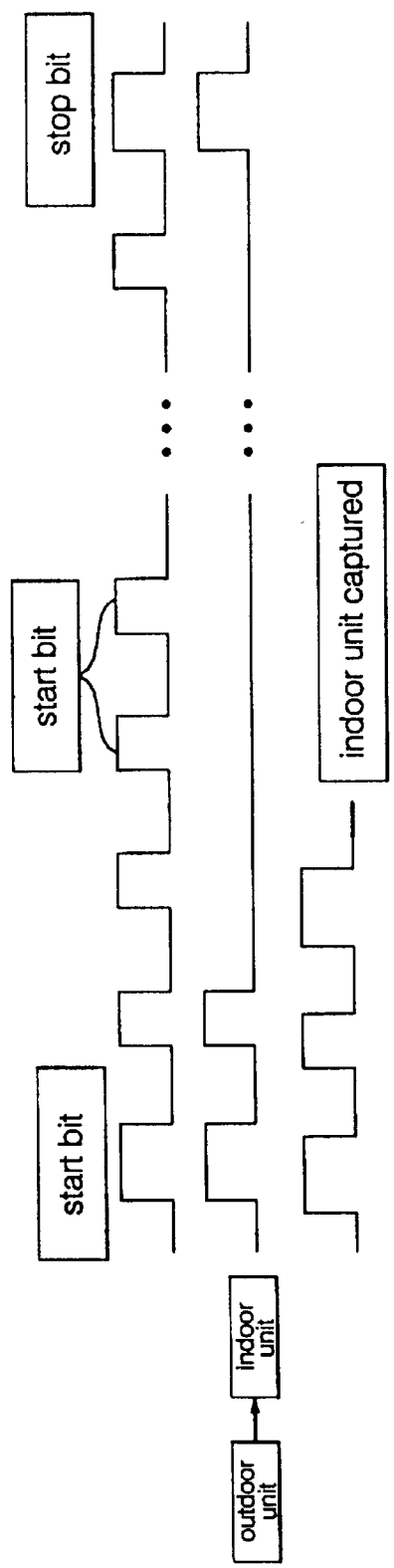

FIGS. 4a, 4b and 4c show waveforms of signals transmitted and received between the outdoor unit and the indoor units according to a basic address setting algorithm of the air conditioning system according to the present invention.

First, as shown in FIG. 4a, the outdoor unit transmits data to the plurality of indoor units, which data is composed of a start bit indicative of the start of an automatic address setting operation, call bits and a stop bit. The start bit has a longer wavelength than that of a general call bit so that it can readily be recognized by the indoor units. The call bits are used to call first digit values of the production numbers of the plurality of indoor units when the production numbers are each composed of 5 digits of 20 bits. That is, as shown in FIG. 4a, the call bits call indoor units of production numbers having first digit values, for example, '0' to 'F', respectively. In response to the call bits transmitted from the outdoor unit, each of the indoor units transmits an acknowledgement signal to the outdoor unit only when the first digit value of the corresponding production number is equal to any one of values corresponding to the call bits. Note that a nibble signifies 4-bit data. As a result, each 5-digit production number of 20 bits is composed of 5 nibbles.

As shown in FIG. 4b, the outdoor unit calls the indoor units to recognize the second digit values or nibbles of production numbers whose first digit values or nibbles are '0', and the indoor units then transmit acknowledgement signals in response to the call bits. FIG. 4c shows waveforms of signals that the outdoor unit transmits to the indoor units when recognizing all the production numbers of the indoor units by repeating the above procedures. Upon receiving an indoor unit capture signal transmitted from the outdoor unit, each indoor unit stores an address assigned thereto.

In order to search for the number of the indoor units and set addresses therein, the outdoor unit uses the following variables. A variable $N_i$ is the total number of bit strings of indoor units that acknowledge each call bit of data transmitted from the outdoor unit. The variable $N_i$ corresponds to each digit (i) of each production number, and is separately stored. The outdoor unit automatic address setter performs the recognition operation beginning with production numbers whose first digit values are '0', up to the last digit values of those production numbers. Thereafter, in order to recognize production numbers whose first digit values are '1', the outdoor unit automatic address setter shifts to a production number digit of $N_i \neq 1$ and then repeats the same operation as that performed to recognize the production numbers whose first digit values are '0' and set addresses therein. A variable $D_i$ is the maximum number of production numbers duplicatable at each digit, which can be calculated as in the below equation 1:

$$D_i = D_{i-1} - (N_i - 1) \quad \text{[Equation 1]}$$

If the number of indoor units captured by the outdoor unit is F, $N_i$ and $D_i$ after indoor unit capture can be updated through the following equations 2 and 3:

$$N_i = N_i - 1 \quad \text{[Equation 2]}$$

$$D_i = D_i - F \quad \text{[Equation 3]}$$

Figure 5:
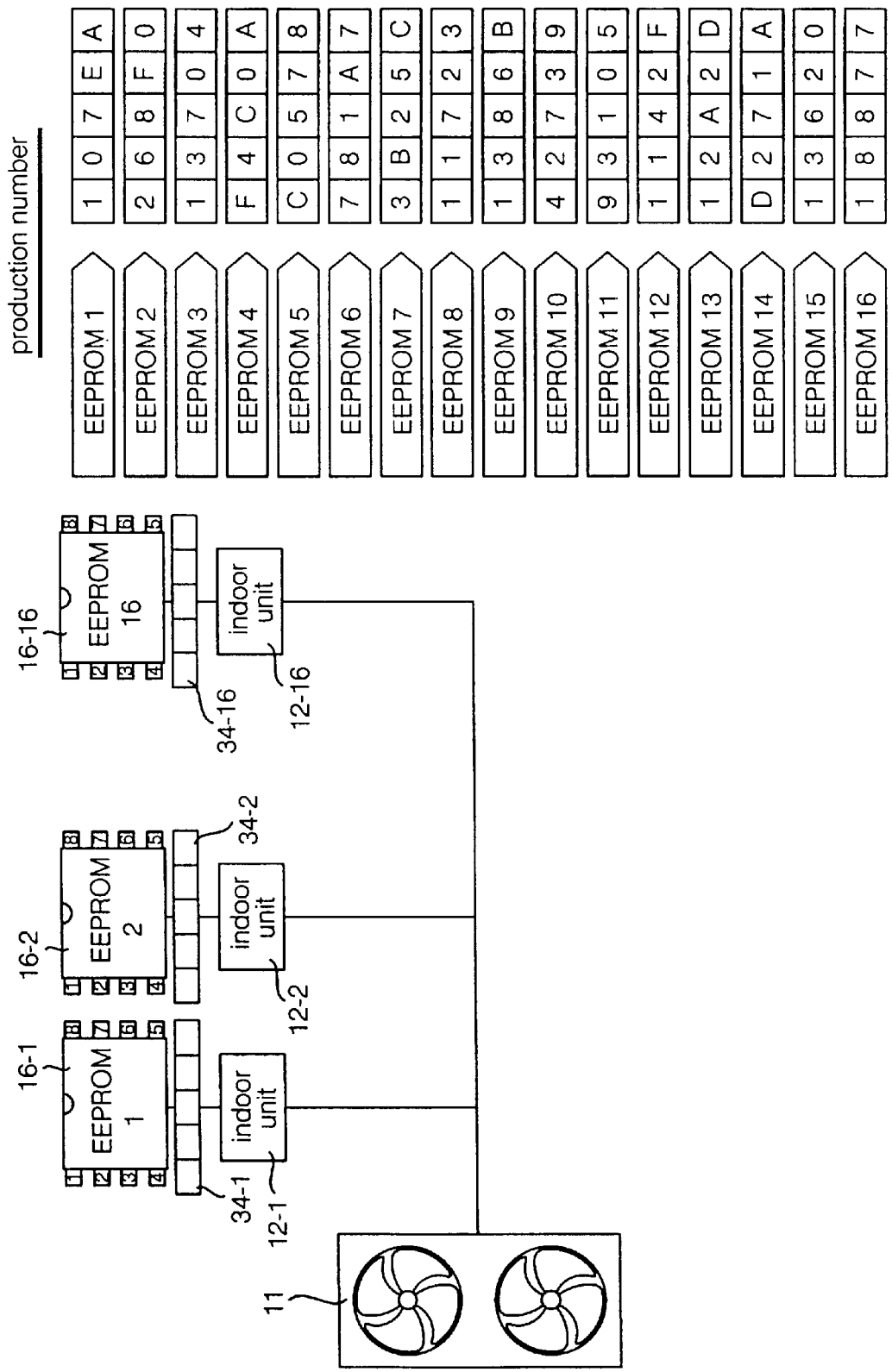
FIG. 5 is a view showing an embodiment of the air conditioning system to which an air conditioning system control method of the present invention is applied.

FIG. 5 shows an embodiment of the air conditioning system wherein addresses are to be automatically set according to an air conditioning system control method of the present invention, and production numbers stored in indoor units of the embodiment. Here, production numbers stored in production number storage areas 34-1 to 34-16 of EEPROMs 16-1 to 16-16 in a plurality of indoor units 12-1 to 12-16 are each composed of 5 digit values or 5 nibbles of 20 bits. An outdoor unit 11 is connected in common to the plurality of indoor units 12-1 to 12-16, and the production numbers stored in the production number storage areas 34-1 to 34-16 have values as shown in FIG. 5.

Figure 6A:
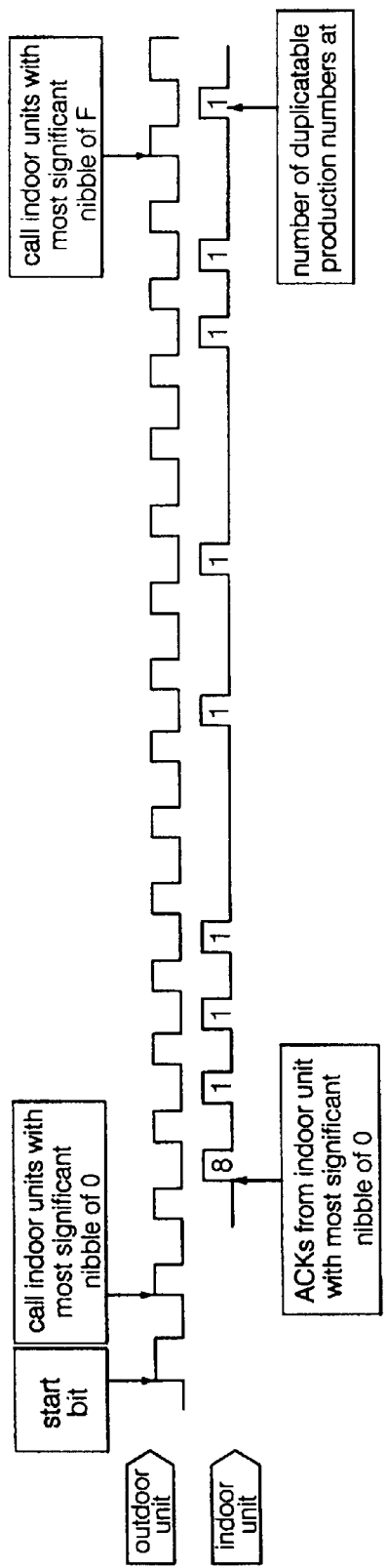
FIGS. 6a to 6x are timing diagrams illustrating an automatic address setting operation of the air conditioning system of FIG. 5 in accordance with the present invention.
Figure 6B:
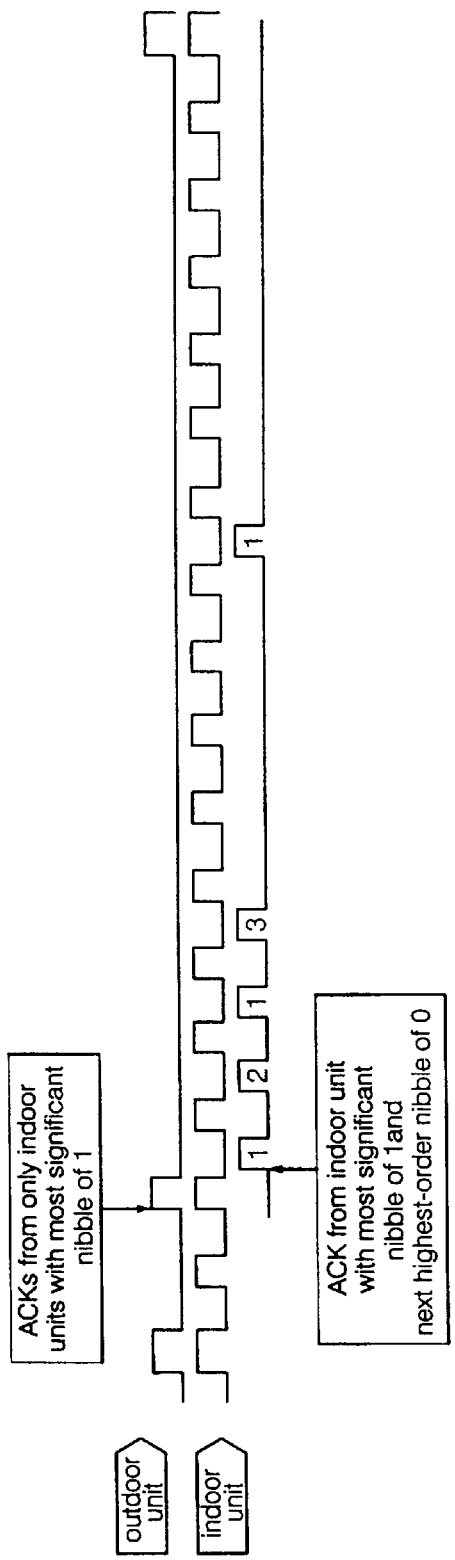
Figure 6C:
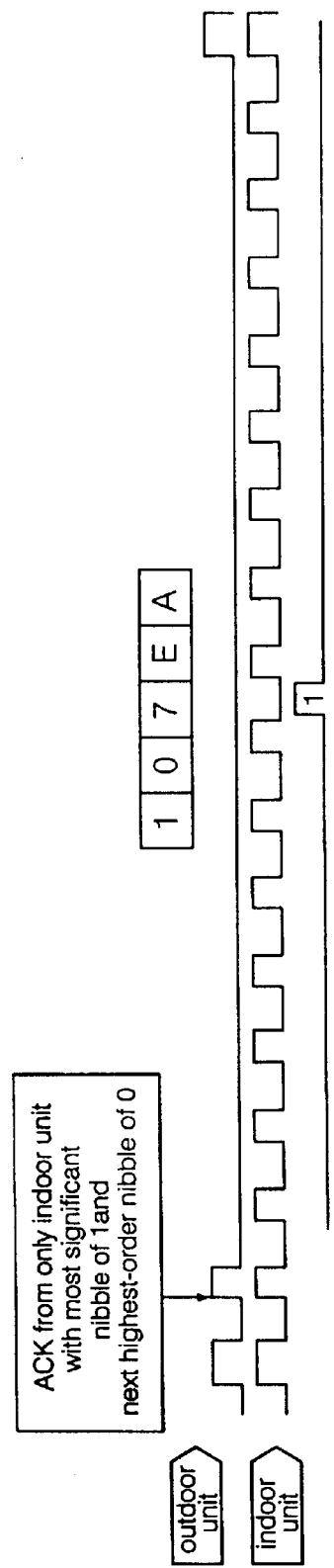
Figure 6D:
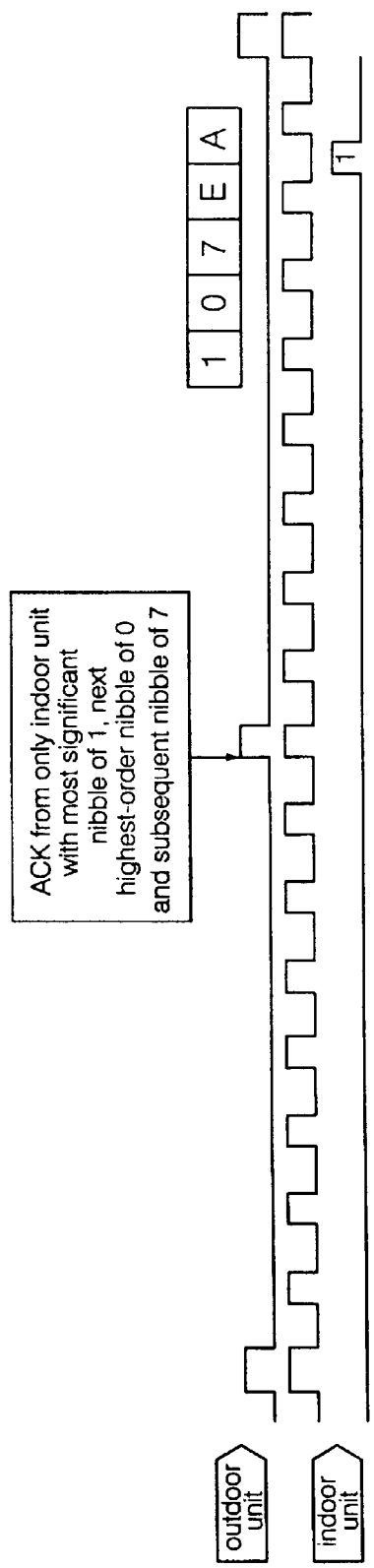
Figure 6E:
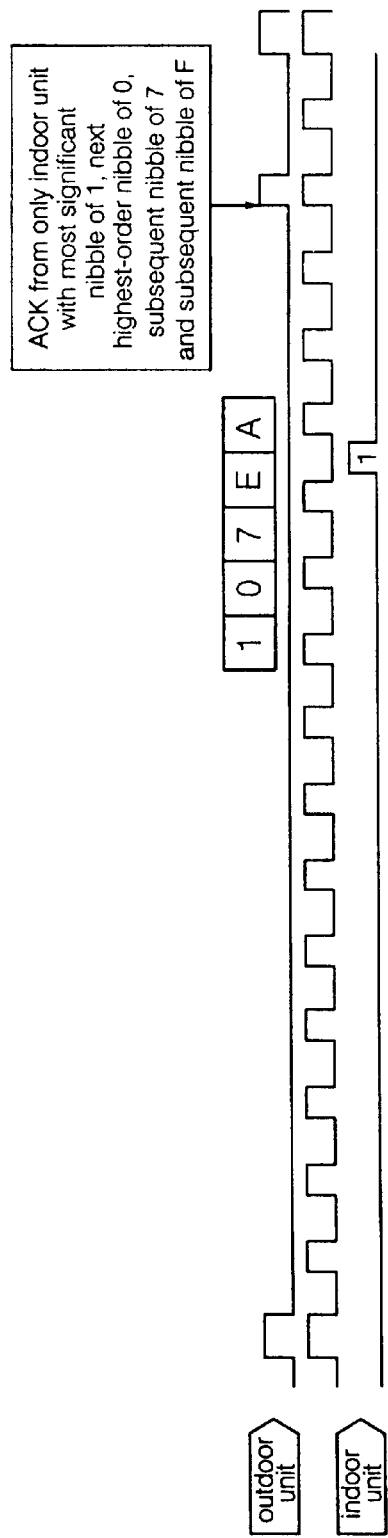
Figure 6F:
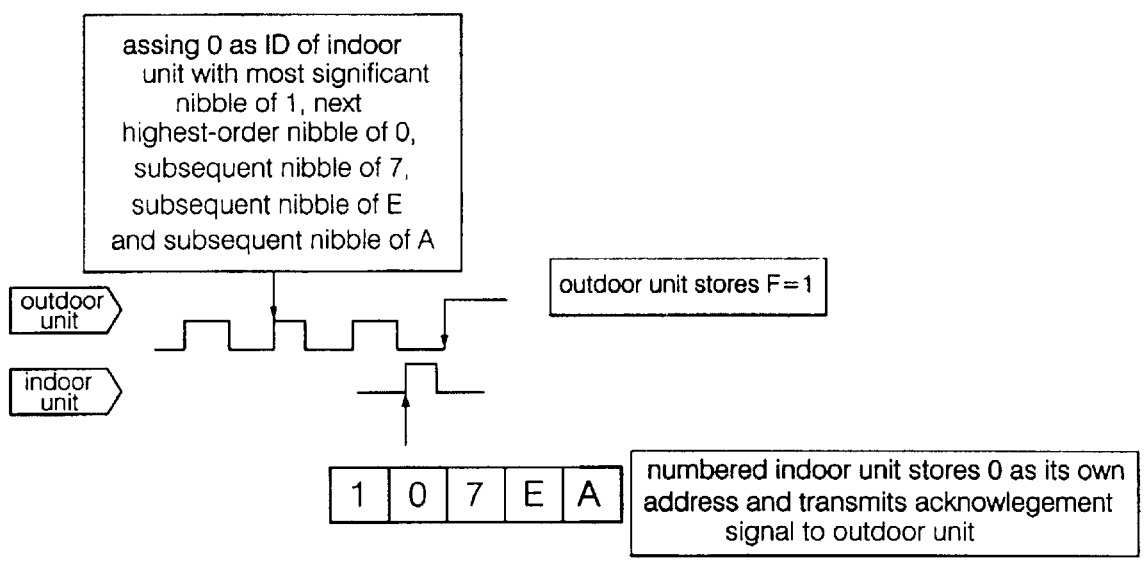
Figure 6G:
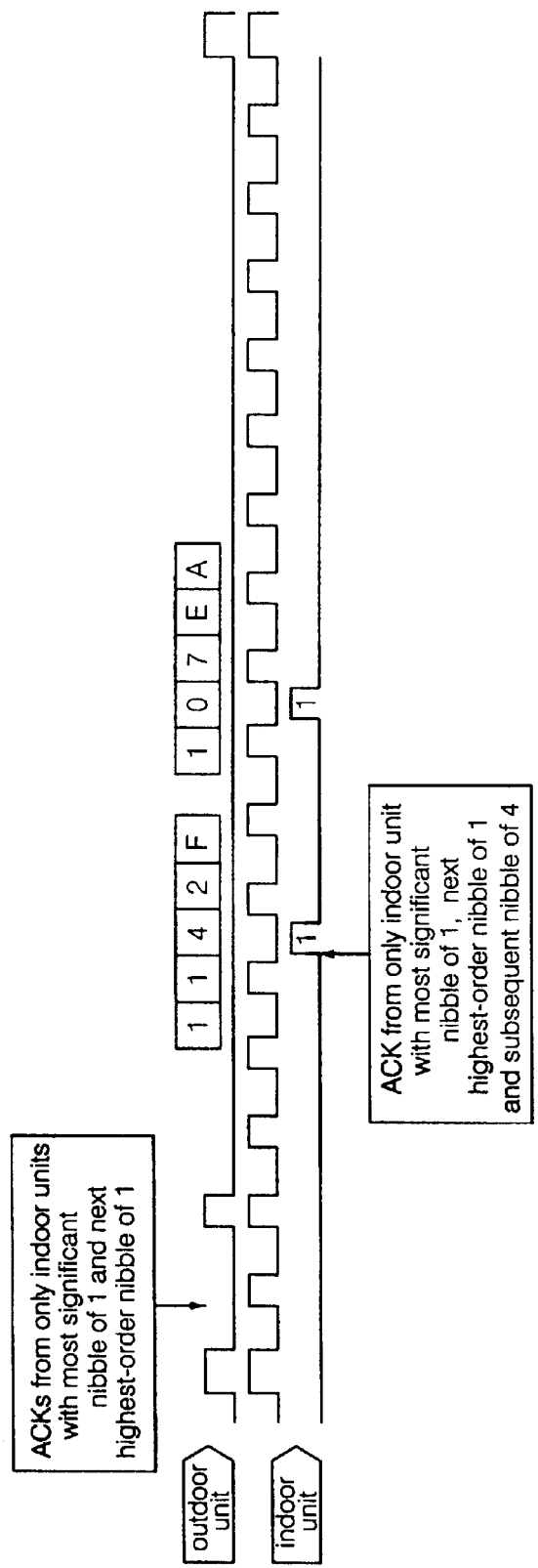
Figure 6H:
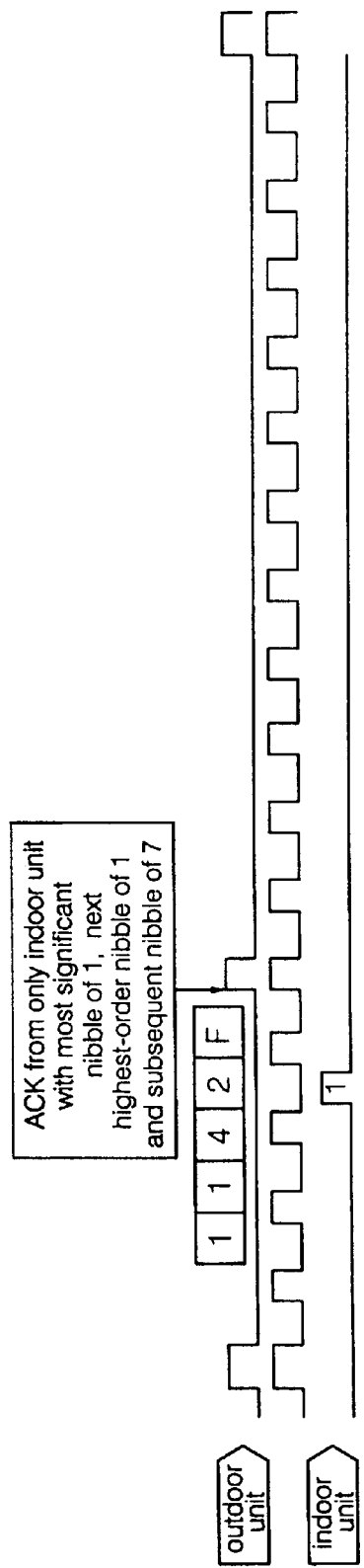
Figure 6I:
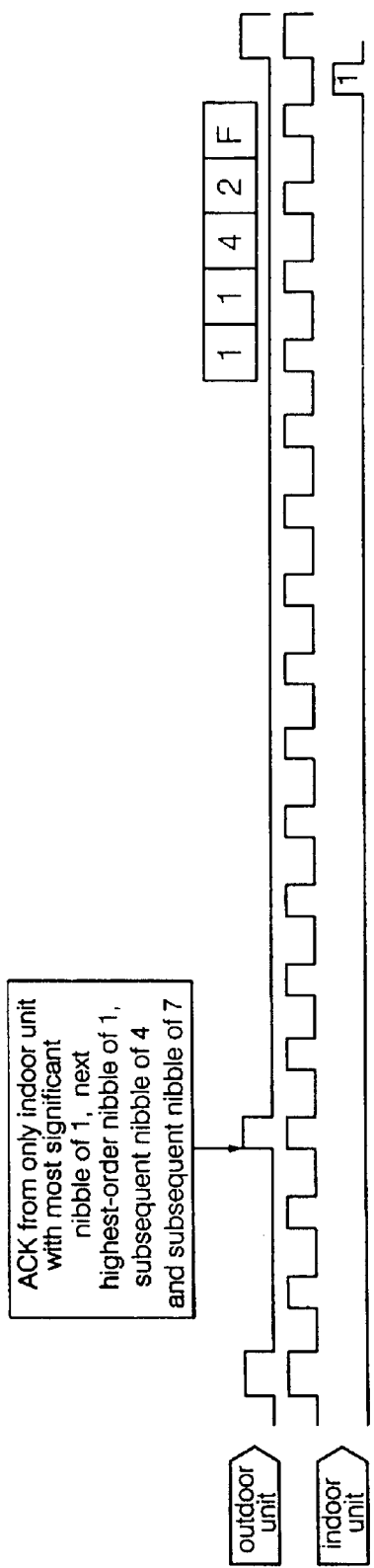
Figure 6J:
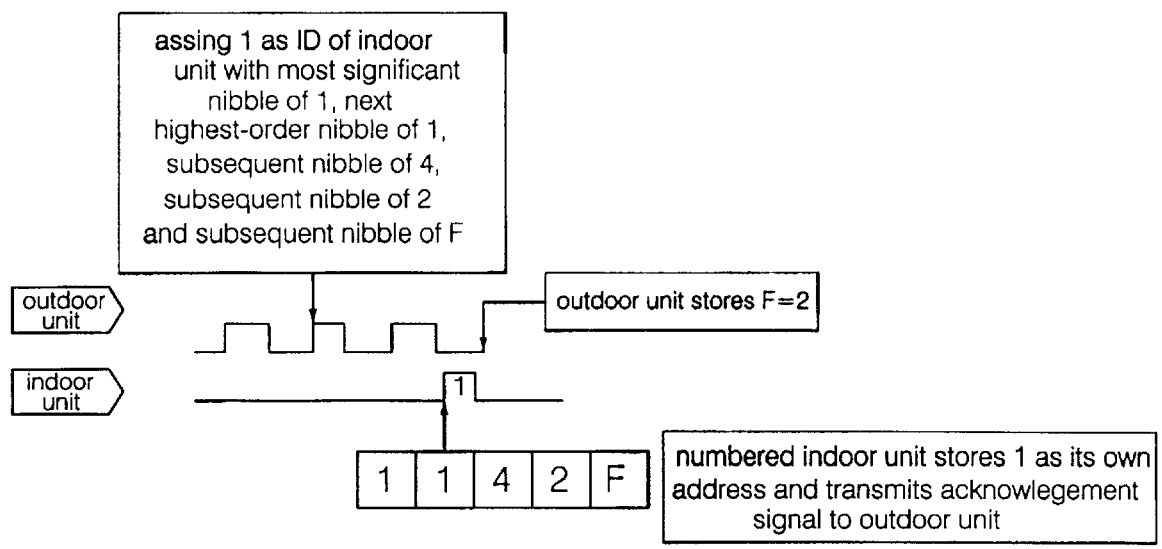
Figure 6K:
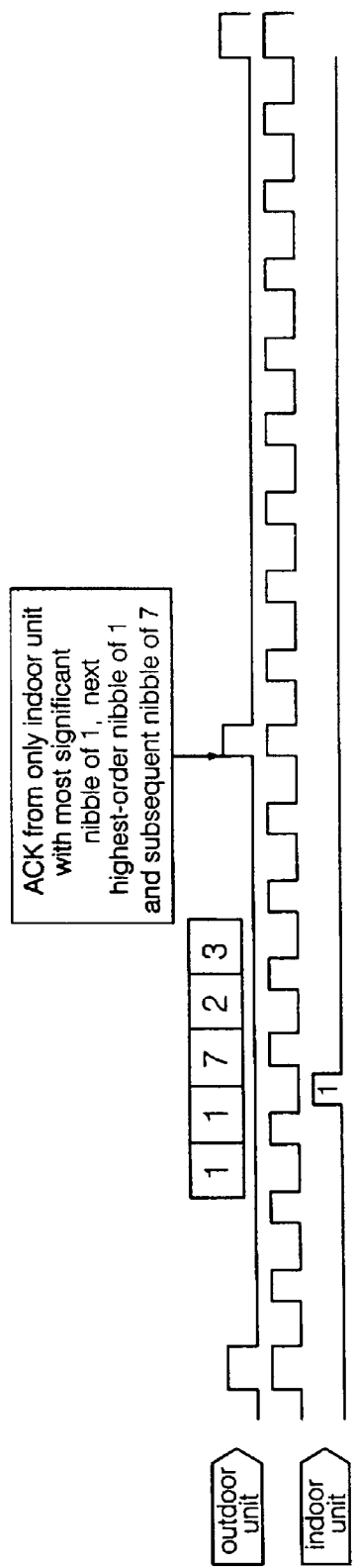
Figure 61:
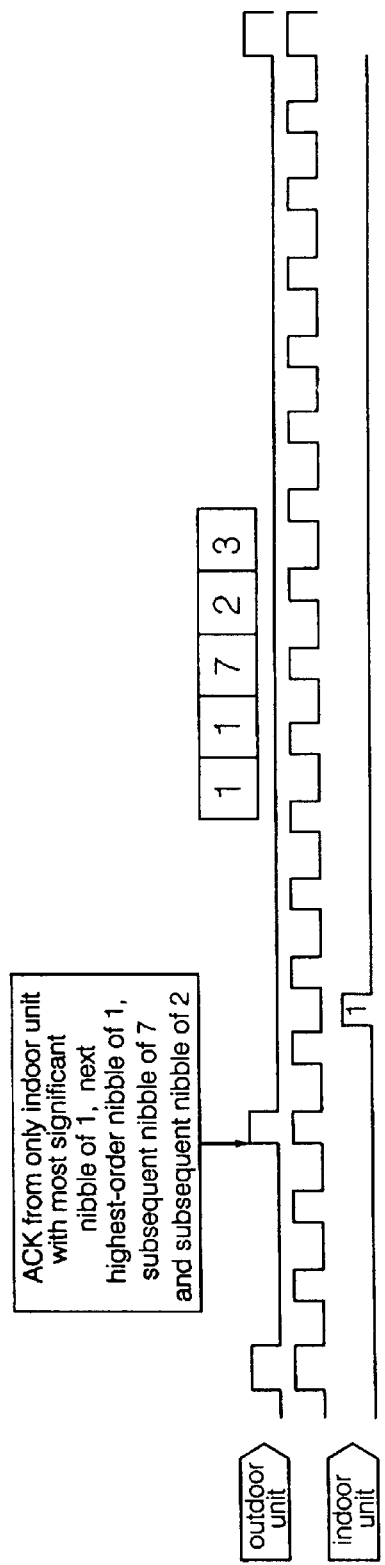
Figure 6M:
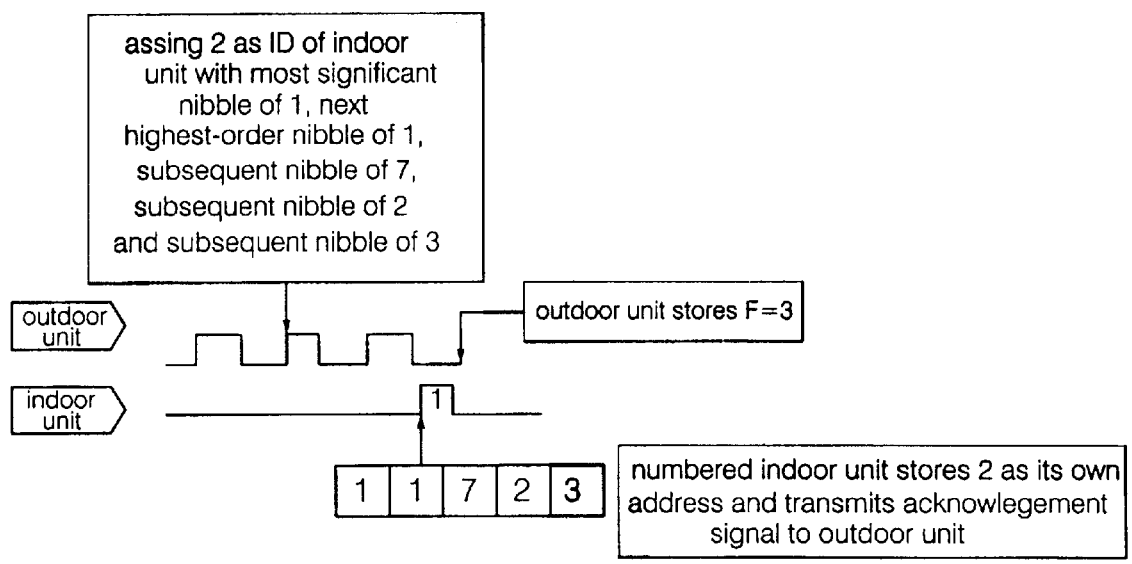
Figure 6N:
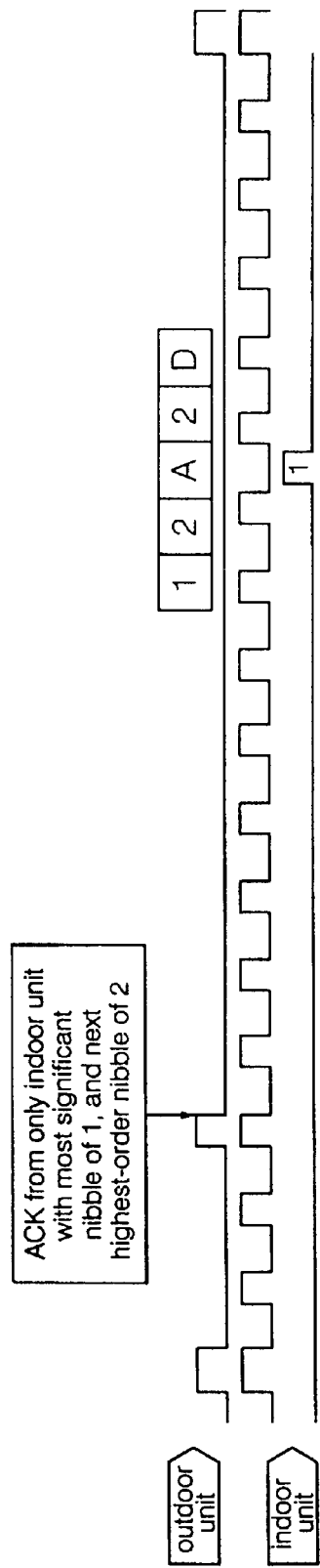
Figure 6O:
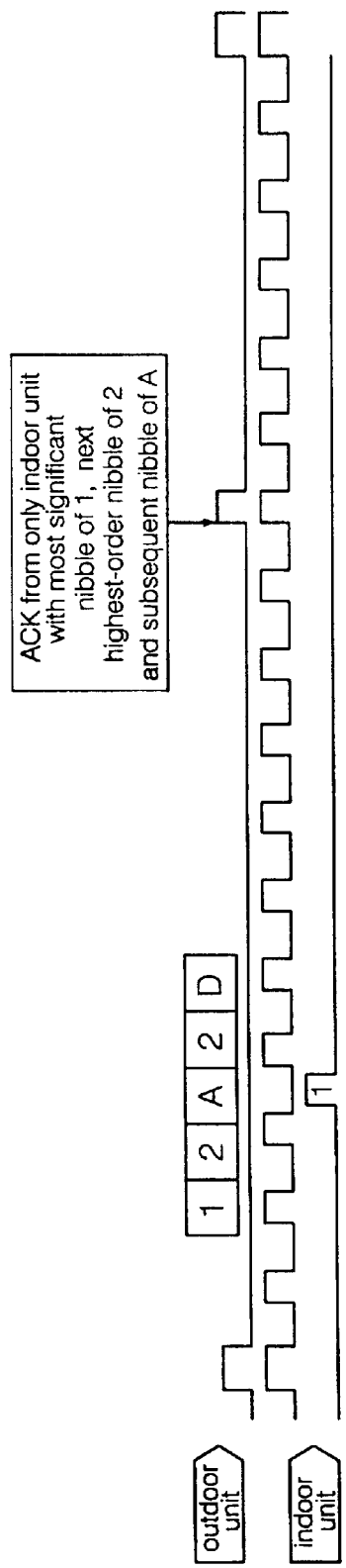
Figure 6P:
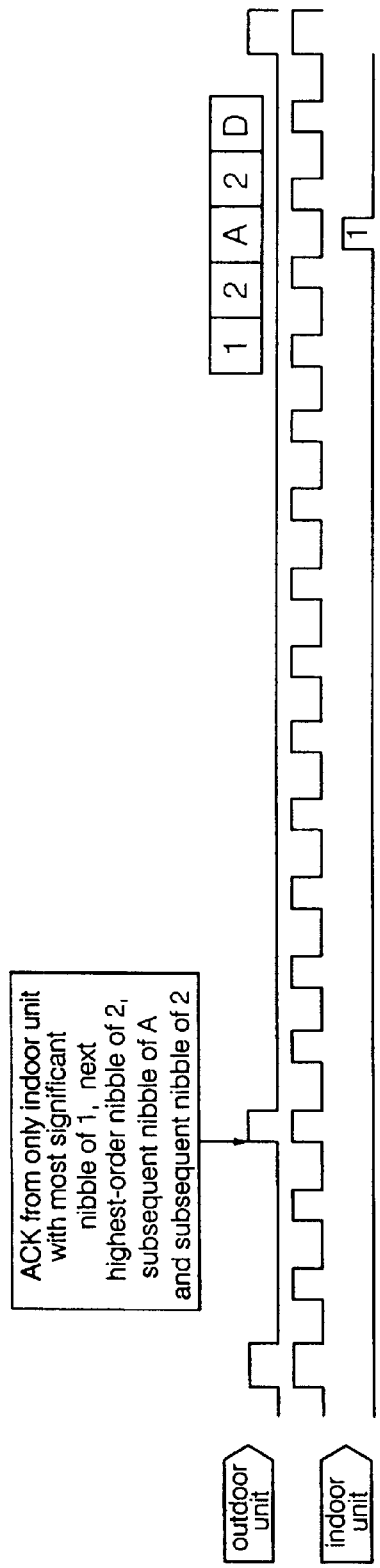
Figure 6Q:
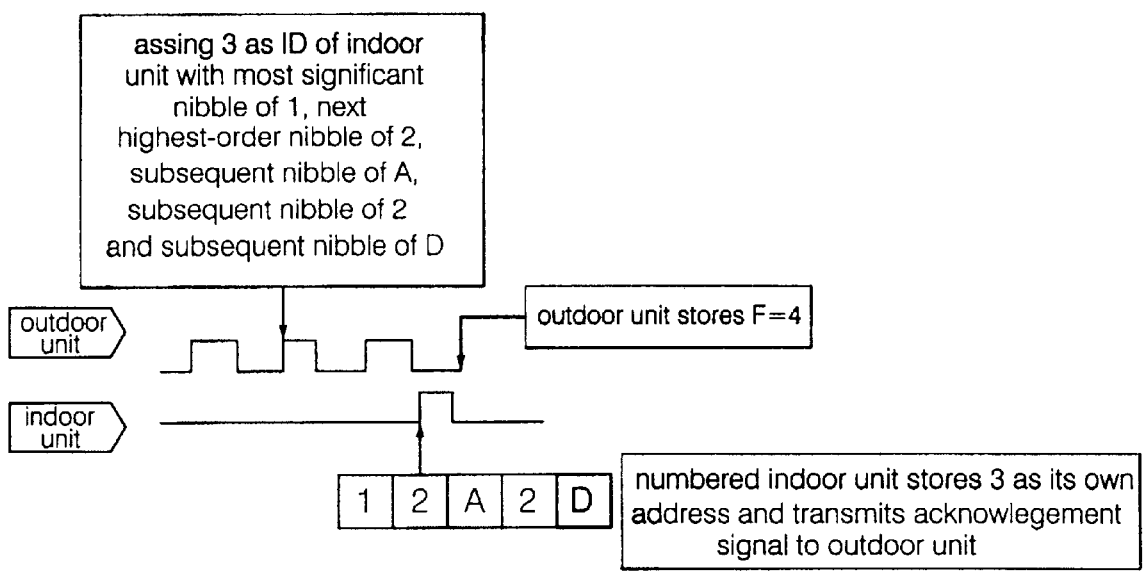
Figure 6R:
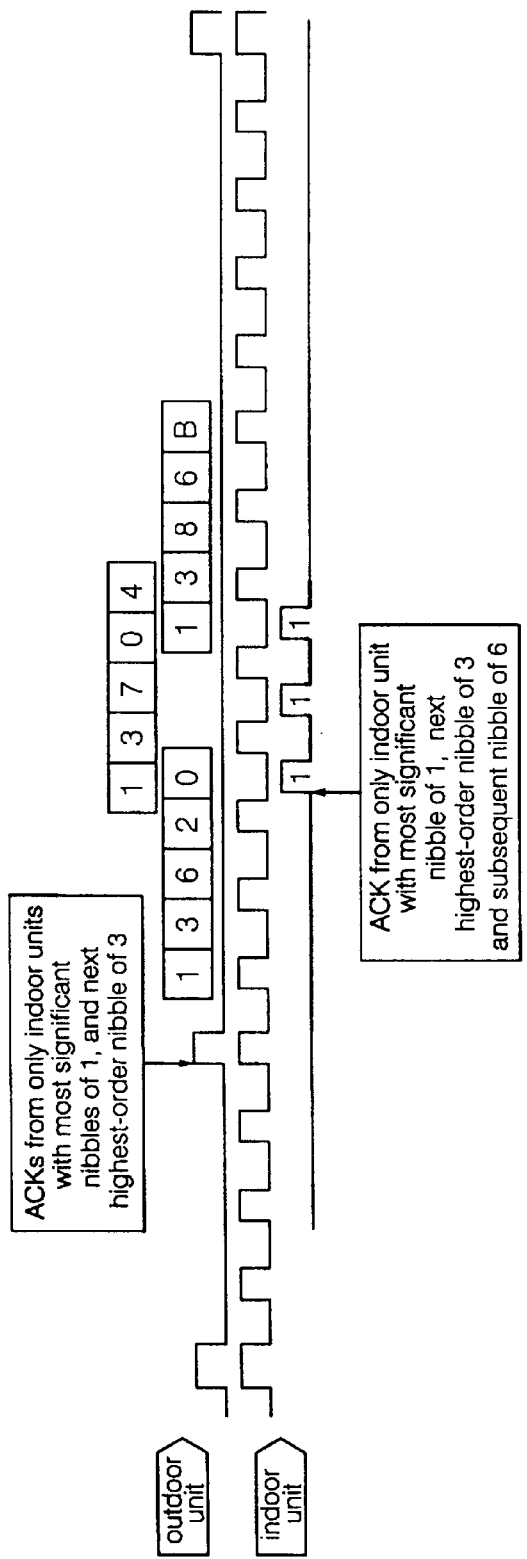
Figure 6S:
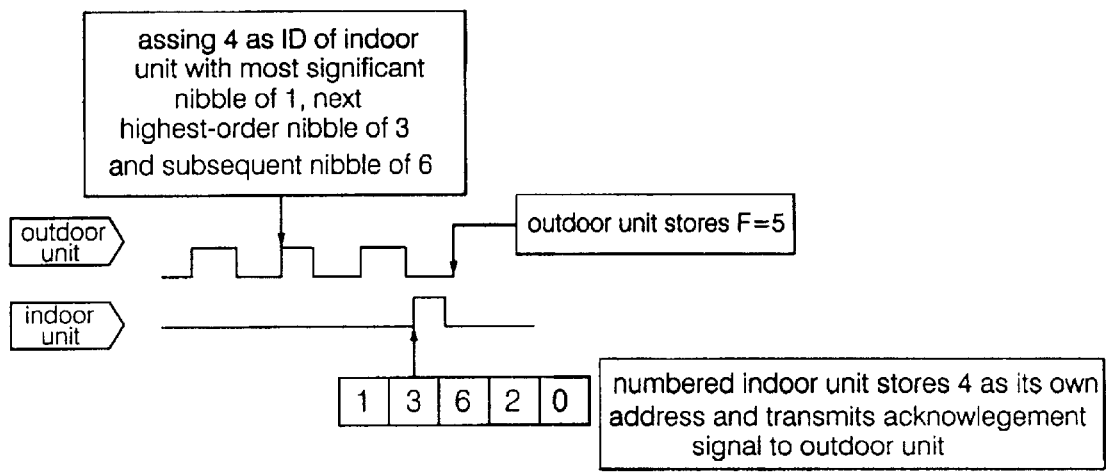
Figure 6T:
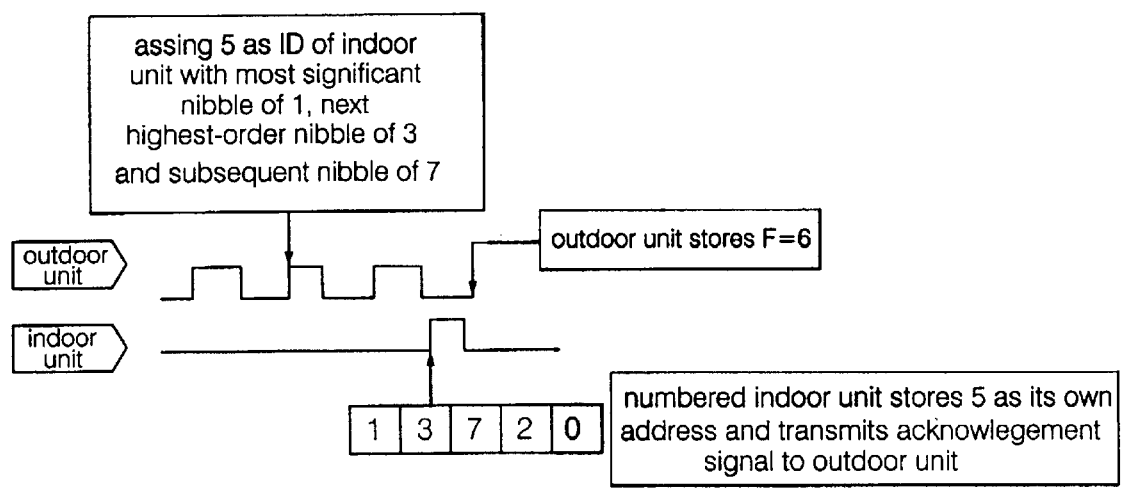
Figure 6U:
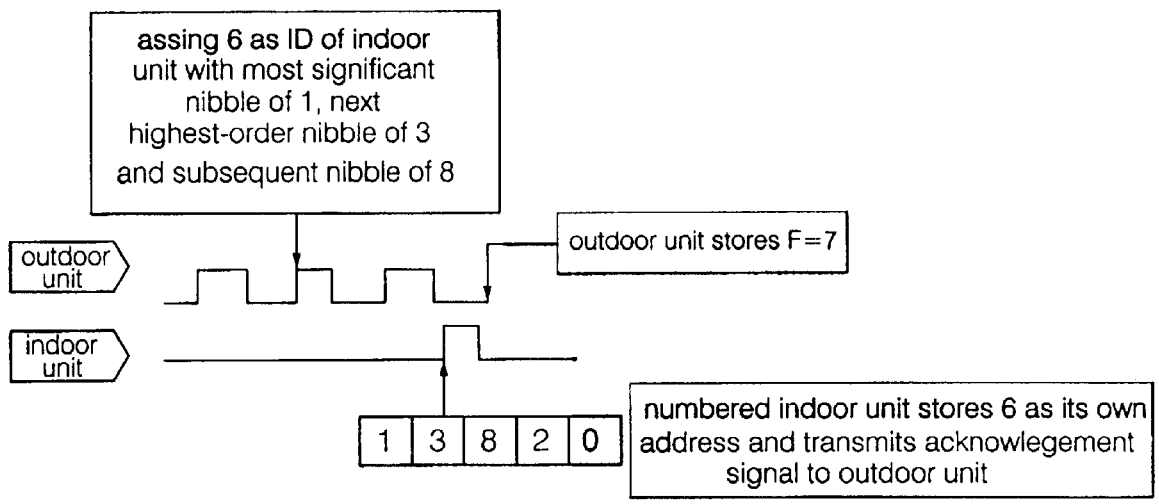
Figure 6V:
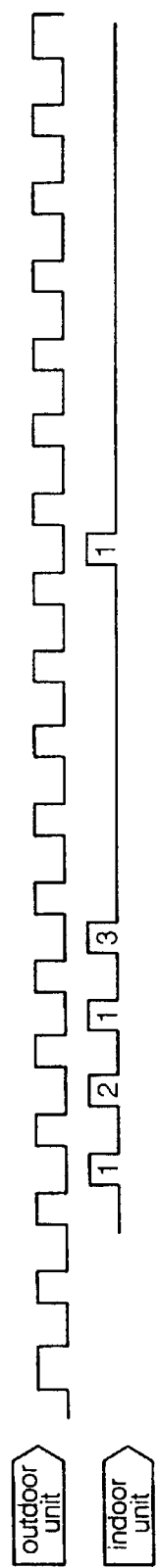
Figure 6W:
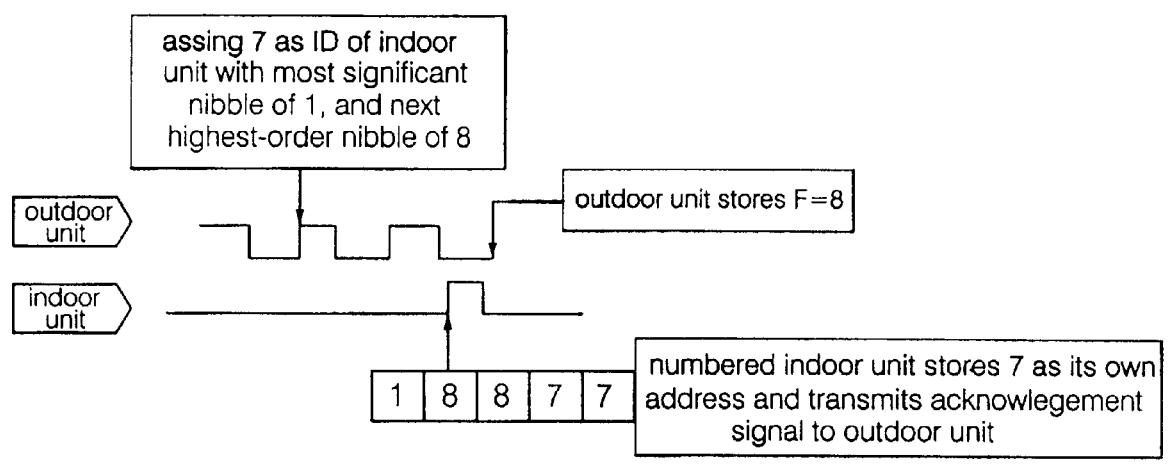
Figure 6X:
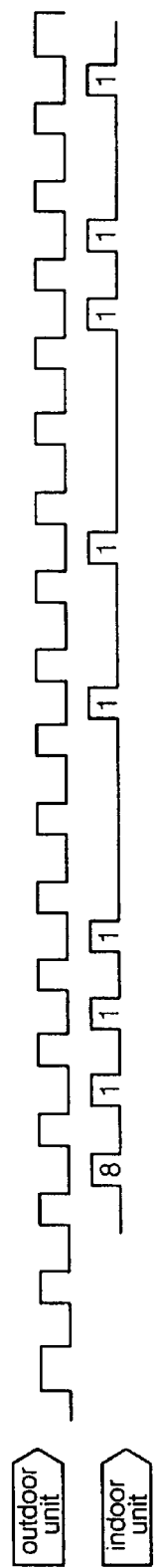

FIGS. 6a to 6x illustrate an automatic address setting operation of the air conditioning system of FIG. 5 in accordance with the present invention.

In FIG. 6a, the outdoor unit transmits data, composed of a start bit, call bits and a stop bit, to the plurality of indoor units, and the indoor units transmit acknowledgement signals to the outdoor unit in response to the transmitted data. The outdoor unit calls indoor units of production numbers having most significant digit values or nibbles of '0' to 'F'. At this time, the outdoor unit stores information regarding bit positions at which the indoor units acknowledge, and the total number of bits ($N_1=9$). The maximum number $D_1$ of production numbers duplicatable at each position is $D_0-(N_1-1)=16-(9-1)=8$. The maximum number $D_0$ of production numbers duplicatable initially at each position is 16, which is equal to the total number of installed indoor units.

In more detail, if the outdoor unit calls indoor units whose most significant nibbles are '1', then eight indoor units having production numbers whose most significant nibbles are '1', as shown in FIG. 5, transmit acknowledgement signals to the outdoor unit. Note that the outdoor unit and the indoor units are interconnected via a single bus line. In this regard, provided that the eight indoor units transmit the acknowledgement signals to the outdoor unit at the same time, a collision will occur in the acknowledgement signals, thereby making it impossible for the outdoor unit to recognize how many indoor units have acknowledged. In other words, the outdoor unit cannot recognize the number of indoor units whose most significant nibbles are '1', except for the presence of those indoor units whose most significant nibbles are '1'. Therefore, the outdoor unit calculates the maximum number of duplicatable production numbers through the above equations and then recognizes values of the remaining nibbles of the indoor units whose most significant nibbles are '1'.

In FIG. 6b, the outdoor unit calls indoor units having production numbers whose most significant nibbles are '1' and whose next highest-order nibbles are '0' to 'F'. In response to acknowledgement signals from such indoor units, the outdoor unit recognizes the presence of an indoor unit having a production number whose most significant nibble is '1' and whose next highest-order nibble is '0', where the total number $N_2$ of bits stored in the outdoor unit is 5 and $D_2 = D_1 - (N_2-1) = 8-4 = 4$. Through the above procedures, $N_3=1$ and $D_3=D_2-(N_3-1)=4-0=4$ in FIG. 6c. In FIG. 6d, $N_4=1$ and $D_4=D_3-D_3-(N_4-1)=4-0=4$. In FIG. 6e, the outdoor unit searches for the last nibble or least significant nibble. In this case, because there exists only one indoor unit acknowledging, the outdoor unit assigns a unique identification (ID) or address to that indoor unit. In FIG. 6f, the outdoor unit stores a production number '107EA' of the indoor unit, recognized through the above procedures of up to FIG. 6e, where F=1. The indoor unit with the production number '107EA' stores '0', set by the outdoor unit, as its own address and then transmits an acknowledgement signal to the outdoor unit.

FIG. 6g shows waveforms of signals that the outdoor unit outputs for recognition of production numbers of indoor units whose most significant nibbles are '1' and whose next highest-order nibbles are '1' and waveforms of signals that the indoor units transmit in response to the output signals from the outdoor unit. In order to recognize values of next nibbles of the production numbers whose most significant nibbles are '1' and whose next highest-order nibbles are '1', the outdoor unit transmits signals '0' to 'F' to the indoor units. As a result, indoor units having production numbers whose most significant nibbles are '1', whose next highest-order nibbles are '1' and whose subsequent nibbles are '4' and '7' transmit acknowledgement signals to the outdoor unit.

In this case, the outdoor unit shifts to a position of $N_i \neq 1$ after setting the address in the indoor unit whose production number is '107EA', as shown in FIGS. 6a to 6f. Then, $N_3=2$ and $D_3=D_2-(N_3-1)=4-1=3$. Because the production number duplication has been recognized in FIGS. 6a to 6f, the maximum number of production numbers duplicatable in the remaining indoor units is $D_2=D_2-1=4-1=3$. If the above operation is performed in FIG. 6h, $N_4=1$ and $D_4=D_3-(N_4-1)=3-0=3$. In FIG. 6i, the outdoor unit searches for the last nibble and only one indoor unit acknowledges. As a result, the outdoor unit sets an address in the acknowledging indoor unit. In FIG. 6j, the outdoor unit stores a production number '1142F' of the indoor unit acknowledging in FIG. 6i, where F=2. The indoor unit with the production number '1142F' stores '1', set by the outdoor unit, as its own address and then transmits an acknowledgement signal to the outdoor unit.

In FIG. 6k, the outdoor unit shifts to a position of $N_i \neq 1$. In order to recognize values of next nibbles of the production number of the indoor unit whose most significant nibble is '1', whose next highest-order nibble is '1' and whose subsequent nibble is '7', the outdoor unit transmits the signals '0' to 'F' to the indoor unit. Then, the indoor unit acknowledges '2' among '0' to 'F' transmitted from the outdoor unit. Because the total number of bits acknowledged by the indoor unit is 1, $N_4=1$ and $D_4=D_3-(N_4-1)=3-0=3$. In FIG. 6l, the outdoor unit searches for the last nibble and only the indoor unit acknowledges. As a result, the outdoor unit sets an address in the acknowledging indoor unit. In FIG. 6m, the outdoor unit stores a production number '11723' of the indoor unit acknowledging in FIG. 6l, where F=3. The indoor unit with the production number '11723' stores '2', set by the outdoor unit, as its own address and then transmits an acknowledgement signal to the outdoor unit.

In FIG. 6n, in order to recognize values of next nibbles of the production number of the indoor unit whose most significant nibble is '1' and whose next highest-order nibble is '2', the outdoor unit transmits the signals '0' to 'F' to the indoor unit, and then stores information regarding a bit position at which the indoor unit acknowledges, and the total number of bits. Here, $N_3=1$ and $D_3=D_2-(N_3-1)=3-0=3$. In FIG. 6o, the outdoor unit shifts to a position of $N_i \neq 1$. In order to recognize values of next nibbles of the production number of the indoor unit whose most significant nibble is '1', whose next highest-order nibble is '2' and whose subsequent nibble is 'A', the outdoor unit transmits the signals '0' to 'F' to the indoor unit. As a result, $N_4=1$ and $D_4=D_3-(N_4-1)=3-0=3$. In FIG. 6p, if the outdoor unit calls '0' to 'F', then an indoor unit with a production number '12A2D' acknowledges. In FIG. 6q, the outdoor unit stores the production number '12A2D' of the indoor unit, where F=4. The indoor unit with the production number '12A2D' stores '3', set by the outdoor unit, as its own address and then transmits an acknowledgement signal to the outdoor unit.

In FIG. 6r, if the outdoor unit transmits data '0' to 'F' to receive acknowledgement signals from only indoor units having production numbers whose most significant nibbles are '1' and whose next highest-order nibbles are '3', indoor units having production numbers whose most significant nibbles are '1', whose next highest-order nibbles are '3' and whose subsequent nibbles are '6', '7' and '8' acknowledge. Here, $N_3=1$ and the maximum number of production numbers duplicatable at each acknowledgement position is $D_3=D_2-(N_3-1)=3-2=1$. Namely, no duplication occurs, so the outdoor unit need not search for the next nibbles of the production numbers of the indoor units acknowledging in FIG. 6r. As a result, the outdoor unit sets addresses in the indoor units acknowledging in FIG. 6r. That is, as shown in FIGS. 6s, 6t and 6u, the outdoor unit sets addresses in indoor units of production numbers '13620', '13720' and '13820' and stores F=5, F=6 and F=7, and those indoor units store '4', '5' and '6' as their own addresses, respectively.

In other words, owing to no duplication, the outdoor unit recognizes only the nibbles '136', '137' and '138' up to the third digits of the production numbers '13620', '13720' and '13820' without searching for nibbles up to the least significant digits of those production numbers. Namely, the outdoor unit need not recognize all digit values of the production numbers whose most significant nibbles, whose next highest-order nibbles and whose subsequent nibbles are '136', '137' and '138', respectively.

In FIG. 6v, through the above procedures, $D_2=1$ and no duplication occurs. As a result, in FIG. 6w, the outdoor unit stores F=8 with respect to a production number '18877' of an indoor unit whose most significant nibble is '1' and whose next highest-order nibble is '8'. The indoor unit stores '7' as its own address. In FIG. 6x, $N_1$ is updated such that $N_1=N_1-1=8$. F=8, stored in the outdoor unit, signifies that all the indoor units have been assigned their addresses without duplication.

Figure 7:
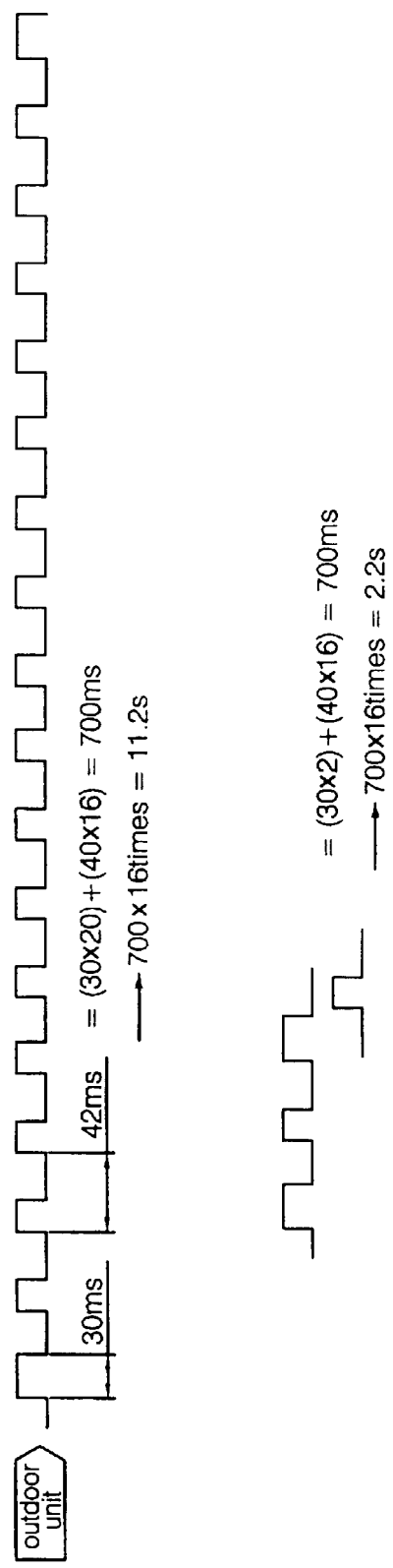
FIG. 7 is a timing diagram illustrating times required for performing the automatic address setting operation of the air conditioning system as shown in FIGS. 6a to 6x.

FIG. 7 is a timing diagram illustrating times required for performing the automatic address setting operation of the air conditioning system as shown in FIGS. 6a to 6x. Time required for the outdoor unit to transmit data is 11.2 s and time required for the outdoor unit to capture all the indoor units is 2.2 s. As a result, the total time required for the address setting is 13.4 s. From this fact, it will be understood that the air conditioning system address setting can be made within 15 seconds in almost all cases to which the air conditioning system control method of the present invention is applied.

As apparent from the above description, the present invention provides an air conditioning system which has a plurality of indoor units installed inside of a predefined space for performing air conditioning and an outdoor unit installed outside of the space for controlling the indoor units, and a method for controlling the same. The indoor units store unique production numbers assigned respectively thereto in manufacturing processes thereof, and the outdoor unit recognizes the production numbers of the indoor units and automatically sets addresses in the indoor units on the basis of the recognized production numbers. Therefore, in an installation process, an installer need not personally set addresses in the indoor units one by one, resulting in greater convenience of installation. Further, as compared with conventional air conditioning systems, a period of time required for the address setting and an error occurrence probability can be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling an air conditioning system, comprising the steps of:

a) by an outdoor unit, transmitting a setting start signal indicative of the start of an automatic address setting operation to a plurality of indoor units;

b) by said outdoor unit, sequentially recognizing production numbers of said indoor units and setting addresses in said indoor units on the basis of the recognized production numbers, wherein said step b) includes the steps of:

b-1) recognizing first digit values of said production numbers of said indoor units;

b-2) searching for the number of ones of said production numbers duplicatable at the first digit values, sequentially recognizing the duplicatable production numbers and setting addresses in ones of said indoor units corresponding to the recognized production numbers; and b-3) setting addresses in ones of said indoor units corresponding to non-duplicatable ones of said production numbers; and c) by said indoor units, storing the addresses set at said step b) and transmitting and receiving data to/from said outdoor unit on the basis of the set addresses, respectively.

2. The method as set forth in claim 1, wherein said step b-1) includes the steps of:
b-1-1) sequentially transmitting a plurality of specific numbers to said plurality of indoor units;
b-1-2), by each of said indoor units, transmitting an acknowledgement signal to said outdoor unit if the first digit value of its production number is the same as any one of the transmitted specific numbers; and
b-1-3) recognizing said first digit values of said production numbers of said indoor units in response to said acknowledgement signals transmitted from said indoor units.

3. The method as set forth in claim 2, wherein the number of duplicatable production numbers is calculated on the basis of the following equation:

$$D_i = D_{i-1} - (N_i - 1)$$

where, $N_i$ is the number of acknowledgement signals transmitted from said indoor units after said outdoor unit sequentially transmits said specific numbers to said indoor units to recognize ith digit values of said production numbers, and $D_i$ is the number of production numbers duplicatable at an ith digit.

4. The method as set forth in claim 3, wherein $N_i$ is updated on the basis of the following equation after the address setting is performed at said step b-2):

$$N_i = N_i - 1.$$

5. The method as set forth in claim 4, wherein $D_i$ is updated on the basis of the following equation after the address setting is performed at said step b-2):

$$D_i = D_i - F$$

where, F is the number of indoor units captured by said outdoor unit.

6. The method as set forth in claim 4, wherein said step b-2) includes the step of setting addresses in ones of said indoor units corresponding to ones of said production numbers whose first digit values are the same as any one of said specific numbers, and then setting addresses in ones of said indoor units corresponding to ones of said production numbers whose first digit values of $N_i \neq 1$ are the same as a different one of said specific numbers.

7. An air conditioning system comprising:
a plurality of indoor units each adapted to suck indoor air, perform a heat exchange operation for the sucked indoor air with a heat exchange medium and discharge the heat-exchanged air, each of said indoor units including a production number storage area defined in a memory which is installed to prevent a corresponding one of said indoor units from being subject to a data loss when a power failure occurs, said production number storage area storing information about a unique production number assigned to said corresponding indoor unit in a manufacturing process thereof; and
an outdoor unit connected in common to said plurality of indoor units and adapted to perform a heat exchange operation for the heat exchange medium with external air, said outdoor unit recognizing first digit values of said production numbers stored in said indoor units, recognizing the remaining digit values of ones of said production numbers whose first digit values are the same, sequentially setting addresses in ones of said indoor units corresponding to said production numbers having the same first digit values on the basis of the recognized first and remaining digit values, and then setting addresses in ones of said indoor units corresponding to ones of said production numbers whose first digit values are not the same, in the same manner as that performed with respect to said indoor units corresponding to said production numbers having the same first digit values.

8. The air conditioning system as set forth in claim 7, wherein said outdoor unit includes:
an outdoor unit automatic address setter for recognizing said production numbers of said indoor units and automatically setting the addresses in said indoor units on the basis of the recognized production numbers;
an outdoor unit data converter for converting data transmitted and received between said outdoor unit and said indoor units into formats appropriate to standards of a communication line and said outdoor unit; and
an outdoor unit communication circuit for transmitting output data from said outdoor unit data converter to said indoor units and for receiving data transmitted from said indoor units and transferring the received data to said outdoor unit data converter; and
wherein each of said indoor units includes:
an indoor unit automatic address setter for transmitting said production number information stored in said production number storage area to said outdoor unit automatic address setter;
an address storage area for storing a corresponding one of said addresses set by said outdoor unit automatic address setter;
an indoor unit data converter for converting data transmitted and received between said corresponding indoor unit and said outdoor unit into formats appropriate to the standard of said communication line and a standard of said corresponding indoor unit; and
an indoor unit communication circuit for transmitting output data from said indoor unit data converter to said outdoor unit and for receiving data transmitted from said outdoor unit and transferring the received data to said indoor unit data converter.

9. The air conditioning system as set forth in claim 8, wherein said outdoor unit automatic address setter is adapted to transmit a setting start signal indicative of the start of an automatic address setting operation to said plurality of indoor units, set said addresses of said indoor units on the basis of the indoor unit production number information, transmitted from said indoor units in response to the setting start signal, and then transmit information about the set addresses respectively to said indoor units; and
wherein said indoor unit automatic address setter is adapted to transmit said indoor unit production number information to said outdoor unit automatic address setter in response to said setting start signal and store a corresponding one of the address information transmitted from said outdoor unit automatic address setter in said address storage area.

* * * * *